United States Patent
Tan

(10) Patent No.: US 9,875,027 B2
(45) Date of Patent: Jan. 23, 2018

(54) DATA TRANSMITTING METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 43 days.

(21) Appl. No.: 15/140,494

(22) Filed: Apr. 28, 2016

(65) Prior Publication Data

US 2017/0255389 A1    Sep. 7, 2017

(30) Foreign Application Priority Data

Mar. 2, 2016   (TW) ................. 105106293

(51) Int. Cl.
*G06F 12/00*   (2006.01)
*G06F 3/06*    (2006.01)
*G06F 12/02*   (2006.01)

(52) U.S. Cl.
CPC .......... *G06F 3/0605* (2013.01); *G06F 3/0616* (2013.01); *G06F 3/0619* (2013.01); *G06F 3/0653* (2013.01); *G06F 3/0659* (2013.01); *G06F 3/0679* (2013.01); *G06F 12/0238* (2013.01); *G06F 12/0246* (2013.01)

(58) Field of Classification Search
CPC .... G06F 3/0605; G06F 3/0616; G06F 3/0653; G06F 3/0659; G06F 3/0679; G06F 12/0238; G06F 12/0246
See application file for complete search history.

(56) References Cited

U.S. PATENT DOCUMENTS

2004/0215912 A1* 10/2004 Vergis ................... G11C 11/406
                                                      711/170
2012/0224425 A1*  9/2012 Fai ....................... G11C 11/5642
                                                      365/185.09
2016/0239235 A1*  8/2016 Chung .................. G06F 3/0629

FOREIGN PATENT DOCUMENTS

TW    200506606    2/2005
TW    201306032    2/2013

OTHER PUBLICATIONS

"Office Action of Taiwan Counterpart Application", dated Dec. 21, 2016, p. 1-p. 4.
"Office Action of Taiwan Counterpart Application", dated Feb. 23, 2017, p. 1-p. 4.

* cited by examiner

*Primary Examiner* — Shawn X Gu
(74) *Attorney, Agent, or Firm* — JCIPRNET

(57) ABSTRACT

A data transmitting method for a memory storage device is provided. The method includes: detecting a temperature of the memory storage device; and determining whether the temperature of the memory storage device is greater than a temperature threshold. If the temperature is greater than the temperature threshold, first data is written into a rewritable non-volatile memory module within a first delay time according to a delay count corresponding to a unit temperature.

27 Claims, 7 Drawing Sheets

DATA TRANSMITTING METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 105106293, filed on Mar. 2, 2016. The entirety of the above-mentioned patent application is hereby incorporated by reference herein and made a part of this specification.

BACKGROUND

Technical Field

The present invention relates to a data transmitting method, and more particularly, to a data transmitting method for a memory storage device having a rewritable non-volatile memory module, and a memory control circuit unit and a memory storage device using the method.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage device which utilizes a flash memory as its storage medium. For these reasons, the flash memory has become an import part of the electronic industries.

However, as storage devices having the rewritable non-volatile memory are made smaller each day, the rewritable non-volatile memory is prone to data loss and aging which are caused by accumulated heat. In addition, when a memory storage device having the rewritable non-volatile memory is operated in high speed (e.g., writing a large amount of data), a lot of energy is consumed to generate lots of heat, and thus the memory storage device is prone to overheat which lowers its access performance or causes damages thereto. Accordingly, it is one of the major subjects in the industry as how to effectively control speed and performance of the memory storage device in order to avoid system overheat during operation of the memory storage device.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data transmitting method, a memory control circuit unit and a memory storage device using the method, which are capable of effectively controlling speed and performance of the memory storage device for transmitting and accessing data, so as to avoid overheat on the memory storage device caused by constantly accessing a large amount of data.

An exemplary embodiment of the invention provides a data transmitting method for a memory storage device having a rewritable non-volatile memory module. The data transmitting method includes: detecting a temperature of the memory storage device, determining whether the temperature of the memory storage device is greater than a temperature threshold, and writing first data into the rewritable non-volatile memory module within a first delay time according to a delay count corresponding to a unit temperature when the temperature of the memory storage device is greater than the temperature threshold.

An exemplary embodiment of the invention provides a memory control circuit unit for controlling a memory storage device having a rewritable non-volatile memory module. The memory control circuit unit includes a host interface, a memory interface and a memory management circuit. The host interface is coupled to a host system, the memory interface is coupled to the rewritable non-volatile memory module, and the memory management circuit is coupled to the host interface and the memory interface. The memory management circuit is configured to detect a temperature of the memory storage device. The memory management circuit is further configured to determine whether the temperature of the memory storage device is greater than a temperature threshold. The memory management circuit is further configured to issue a first write command which instructs to write first data into the rewritable non-volatile memory module within a first delay time according to a delay count corresponding to a unit temperature when the temperature is greater than the temperature threshold.

An exemplary embodiment of the invention provides a memory storage device, which includes a connection interface unit, a rewritable non-volatile memory module and aforesaid memory control circuit unit. The connection interface unit is coupled to a host system, and the memory control circuit unit is coupled to the connection interface unit and the rewritable non-volatile memory module. The memory control circuit unit is configured to detect a temperature of the memory storage device and determine whether the temperature of the memory storage device is greater than a temperature threshold. The memory control circuit unit issues a first write command which instructs to write first data into the rewritable non-volatile memory module within a first delay time according to a delay count corresponding to a unit temperature when the temperature is greater than the temperature threshold.

Based on the above, in the exemplary embodiments of the invention, speed and performance of the memory storage device for transmitting and accessing data are controlled by restricting the data amount transmitted from the host system into the memory storage device and the data amount written from the memory control circuit unit (or the memory management circuit) in the memory storage device into the rewritable non-volatile memory module within specific time. As a result, the data transmission and access speeds may be effectively controlled when the temperature of the memory storage device is extremely high, so that heat generation and heat dissipation of the memory storage device may reach a stable state.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
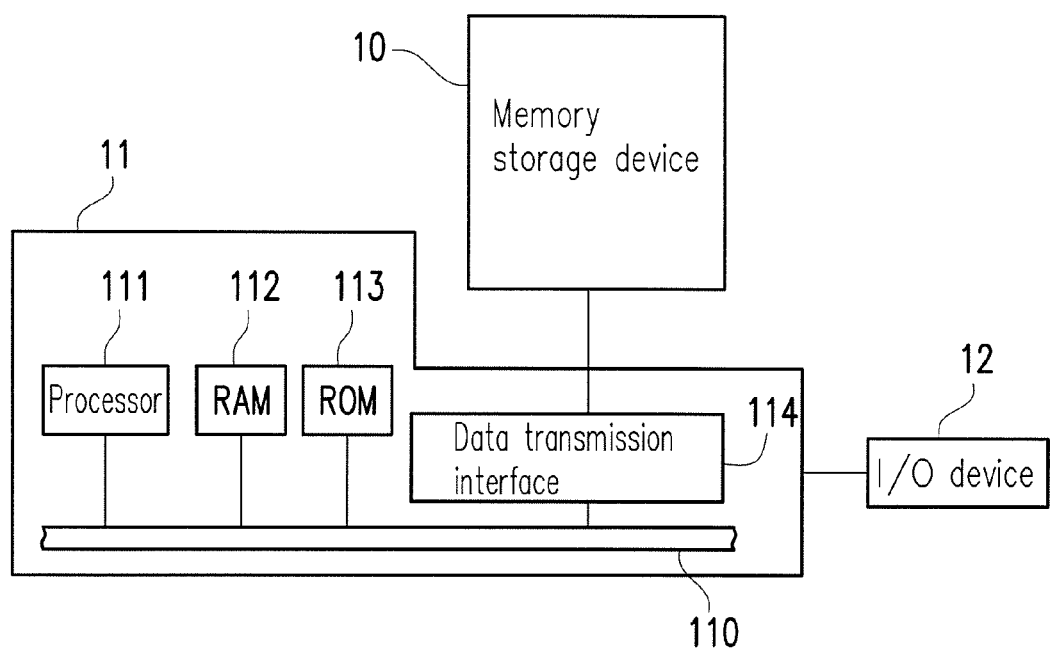
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured together with a host system so that the host system may write data to or read data from the memory storage device.

Figure 2:
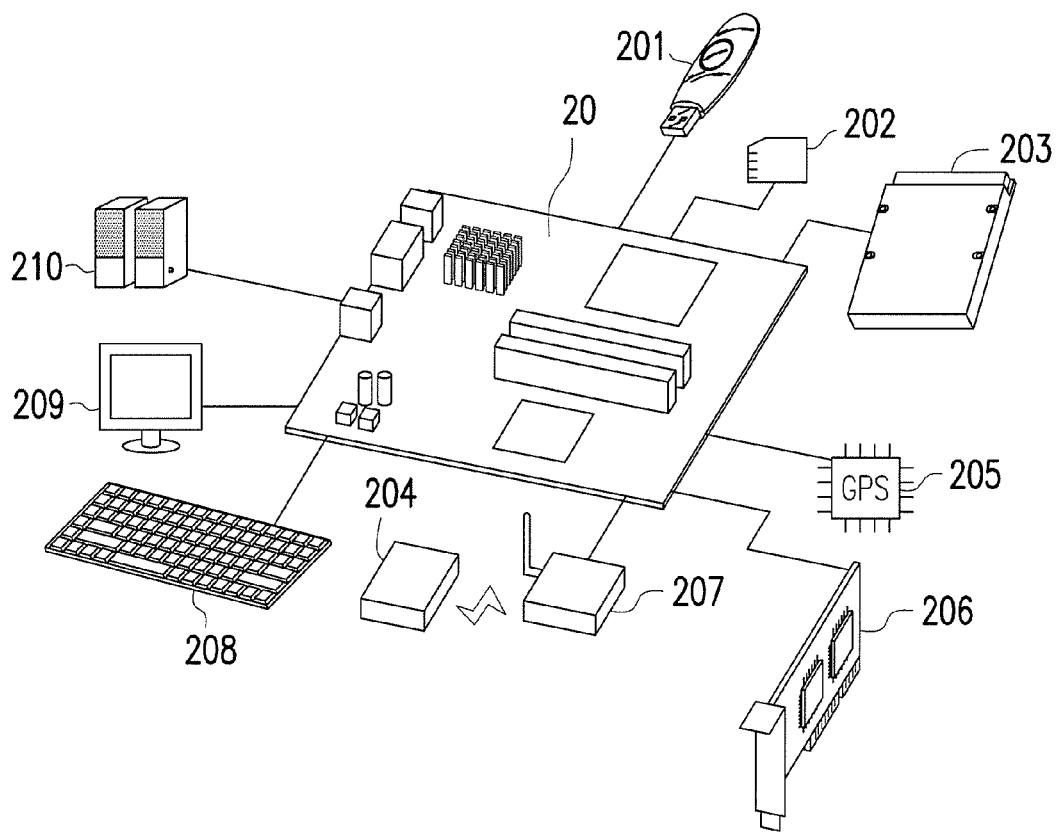
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 may write data into the memory storage device 10 or read data from the memory storage device 10 through the data transmission interface 114. Further, the host system 111 is coupled to an I/O device 12 through the system bus 110. For example, the host system 11 can transmit output signals to the I/O device 12 or receive input signals from I/O device 12 through the system bus 110.

In the present exemplary embodiment, the processor 111, the RAM 112, the ROM 113 and the data transmission interface 114 are disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 through the wireless transmission device 207.

Figure 3:
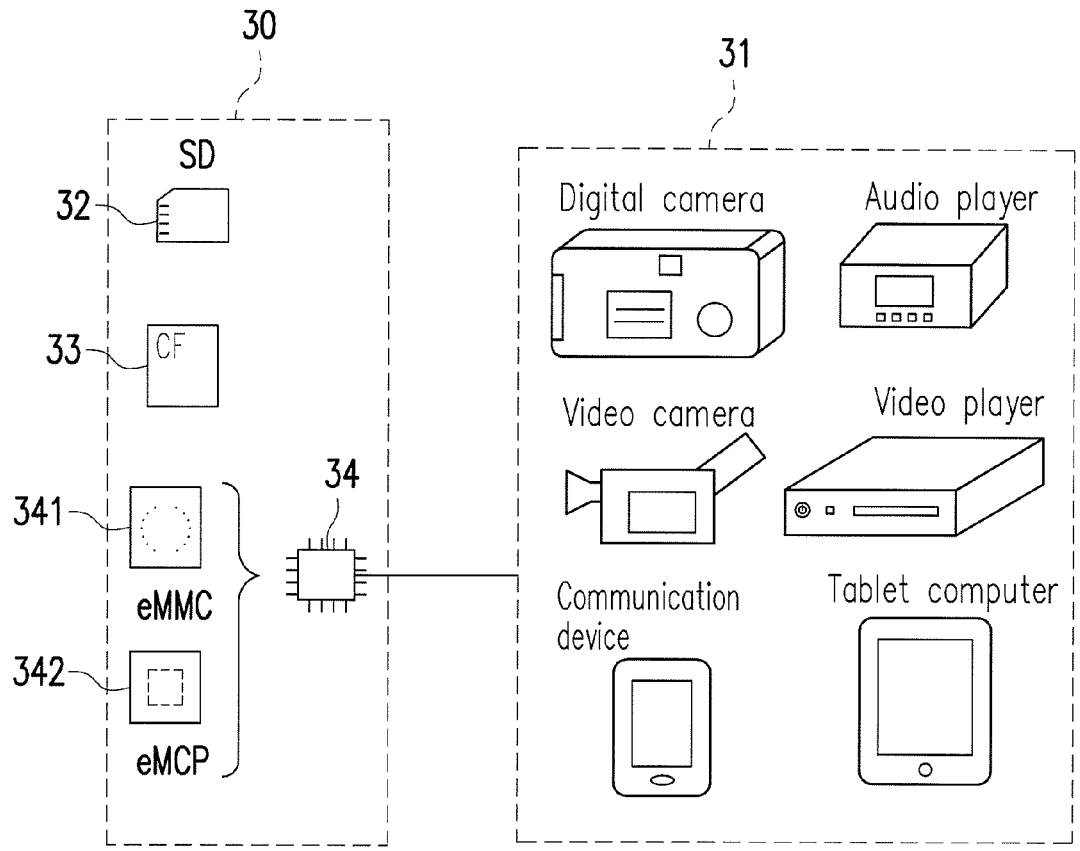
FIG. 3 is a schematic diagram illustrating a host system and a memory storage device according to another exemplary embodiment of the invention.

In an exemplary embodiment, aforementioned host system may be any systems capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
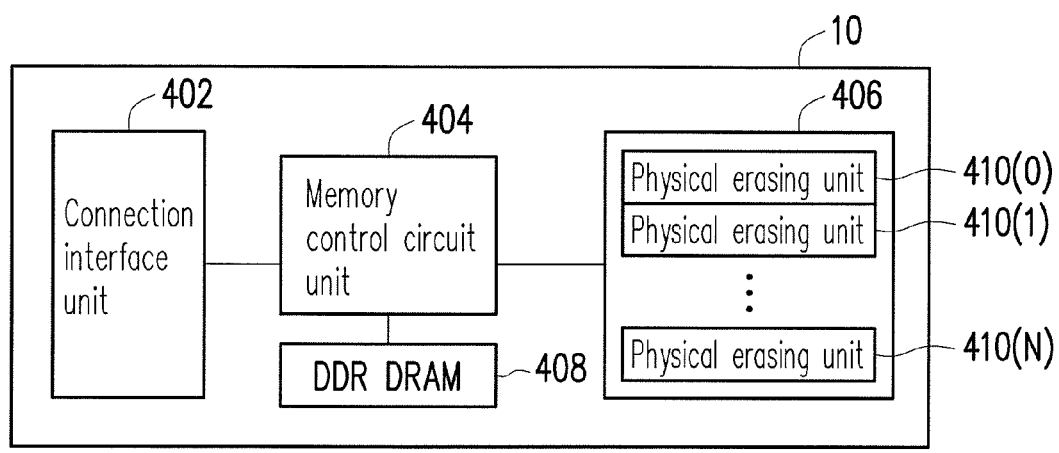
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control instructions which are implemented in a hardware form or in a firmware form, so as to execute operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be constituted by 64 physical programming units, 256 physical programming units or any amount of the physical programming units.

More specifically, the physical erasing unit is a minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 bytes. However, in other exemplary embodiments, the data bit area may also contain more or less physical access addresses, and the number and size of the physical access addresses are not limited by the invention. For example, in one exemplary embodiment, the physical erasing unit is a physical block, and the physical programming unit is a physical page or a physical sector, but the invention is not limited thereto.

In the present exemplary embodiment, the rewritable non-volatile memory module 406 is a MLC (Multi Level Cell) NAND flash memory module (i.e., a flash memory module capable of storing two data bits in one memory cell). However, the invention is not limited thereto. The rewritable non-volatile memory module 406 may also be a SLC (Single Level Cell) NAND flash memory module, (i.e., a flash memory module capable of storing one data bit in one memory cell), a TLC (Trinary Level Cell) NAND flash memory module (i.e., a flash memory module capable of storing three data bits in one memory cell), other flash memory modules or any memory module having the same features.

In another exemplary embodiment of the invention, the memory storage device 10 further includes a DDR DRAM (Double Data Rate DRAM) 408, which is configured to temporarily store a plurality of logic gate or control instructions implemented in firmware manner and executed by memory control circuit unit 404. For example, when the memory control circuit unit 404 is enabled, the memory control circuit unit 404 executes a driving code to load the control instructions stored in the rewritable non-volatile memory module 406 into the DDR DRAM 408. Accordingly, the memory control circuit unit 404 may perform operations of writing, reading or erasing data in the rewritable non-volatile memory module 406 according to the control instructions. Herein, the driving code is, for example, burnt into a ROM of the memory control circuit unit 404. However, the invention is not intended to limit the location where the DDR DRAM 408 is disposed. For example, in another exemplary embodiment, the DRR DRAM 408 may be implemented in the memory control circuit unit 404.

Figure 5:
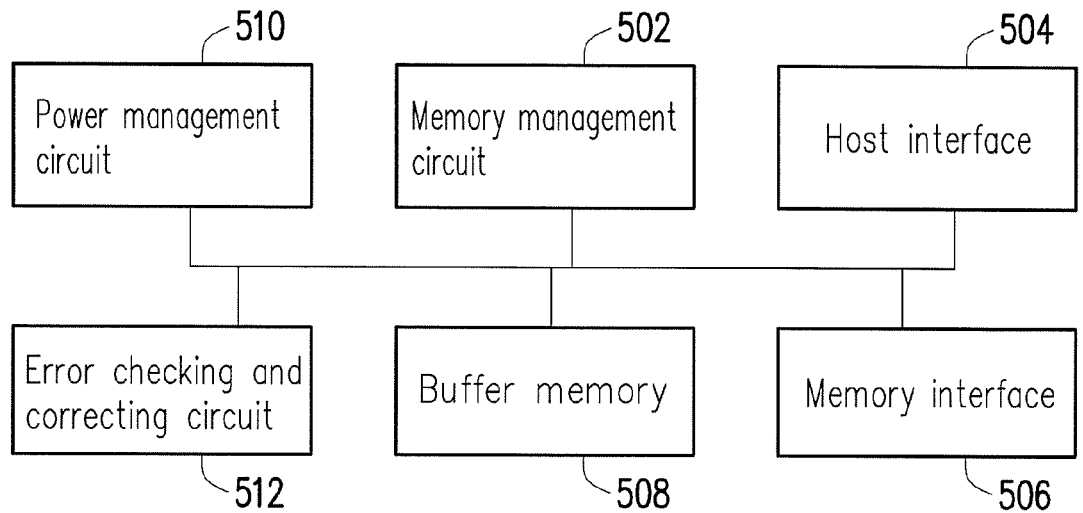
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control instructions. During operation of the memory storage device 10, the control instructions are executed to perform various operations such as writing, reading and erasing data.

In this exemplary embodiment, the control instructions of the memory management circuit 502 are implemented in form of firmware. For instance, the memory management circuit 502 has a microprocessor unit (not illustrated) and a ROM (not illustrated), and the control instructions are burned into the ROM. When the memory storage device 10 operates, the control instructions are executed by the microprocessor to perform operations of writing, reading or erasing data.

In another exemplary embodiment of the invention, the control instructions of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). In the example where the DDR DRAM 408 is disposed inside the memory control circuit unit 404, the random access memory of the memory management circuit 502 may be, for example, aforesaid DDR DRAM 408. Particularly, the read only memory has the driving code, which is executed by the microprocessor unit to load the control instructions stored in the rewritable non-volatile memory module 406 to the random access memory of the memory management circuit 502 when the memory control circuit unit 404 is enabled. Thereafter, the control instructions are executed by the microprocessor unit to execute operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the physical units of the rewritable non-volatile memory module 406 or a group thereof. The memory writing circuit is configured to issue a write command sequence for the rewritable non-volatile memory module 406 in order to write data into the rewritable non-volatile memory module 406. The memory reading circuit is configured to issue a read command sequence for the rewritable non-volatile memory module 406 in order to read data from the rewritable non-volatile memory module 406. The memory erasing circuit is configured to issue an erase command sequence for the rewritable non-volatile memory module 406 in order to erase data from the rewritable non-volatile memory module 406. The data processing circuit is configured to process both the data to be written into the rewritable non-volatile memory module 406 and the data to be read from the rewritable non-volatile memory module 406. Each of the write command sequence, the read command sequence and the erase command sequence may include one or more program codes or command codes, respectively, and instruct the rewritable non-volatile memory module 406 to perform the corresponding operations, such as writing, reading and erasing. In an exemplary embodiment, the memory management circuit 502 may further issue command sequence of other types to the rewritable non-volatile memory module 406 for instructing to execute the corresponding operations.

The host interface 504 is coupled to the memory management circuit 502 and configured to couple to the connection interface unit 402, so as to receive and identify commands and data sent from the host system 11. In other words, the commands and the data sent from the host system 11 are passed to the memory management circuit 502 through the host interface 504. In this exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals or data on the bus. The signals or the data may include command codes and programming codes. For example, in the read command sequence, information such as identification codes and memory addresses are included.

In an exemplary embodiment, the memory control circuit unit 404 further includes a buffer memory 508, a power management circuit 510 and an error checking and correcting circuit 512.

The buffer memory 508 is coupled to the memory management circuit 502 and configured to temporarily store the data and commands from the host system 11 or the data from the rewritable non-volatile memory module 406.

Figure 6:
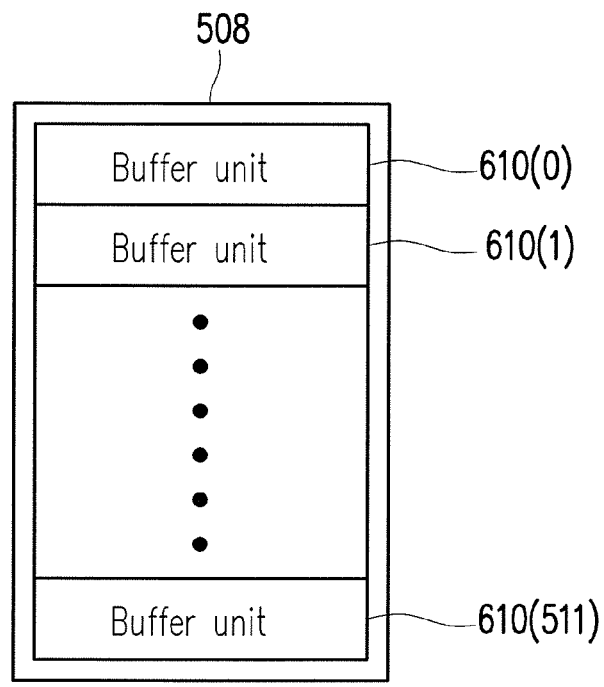
FIG. 6 is a schematic diagram illustrating a buffer memory according to an exemplary embodiment.

FIG. 6 is a schematic diagram illustrating a buffer memory according to an exemplary embodiment.

Referring to FIG. 6, the buffer memory 508 has 512 buffer units (i.e., buffer units 610(0) to 610(511)) and a size of each of the buffer units is 4 KB. Specifically, a size of four buffer units is corresponding to a size of one physical programming unit (also known as a first unit size) in the rewritable non-volatile memory. However, it should be understood that, the present exemplary embodiment is not intended to limit the number of the buffer units disposed in the buffer memory 508, the size of the buffer unit and a size of data transmitted by the host system 11. For example, in other exemplary embodiments, the number of the buffer units may be more or less than a size of the 512 buffer units. Further, the host system 11 transmits or accesses data in 4 KB units (also known as a second unit size), and the memory control circuit unit 404 (or the memory management circuit 502) transmits or accesses data in 16 KB units (i.e., the first unit size), for example. Alternatively, in another exemplary embodiment, each time the data transmitted or accessed by the host system 11 may also be greater than or less than 4 KB, and each time the data transmitted or accessed by the memory control circuit unit 404 (or the memory management circuit 502) may also be greater than or less than 16 KB.

Referring back to FIG. 5, the power management unit 510 is coupled to the memory management circuit 502 and configured to control a power of the memory storage device 10.

The error checking and correcting circuit 512 is coupled to the memory management circuit 502 and configured to execute an error checking and correcting process to ensure the correctness of data. Specifically, when the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may execute the error checking and correcting procedure for the read data according to the error checking and correcting code.

Figure 7A:
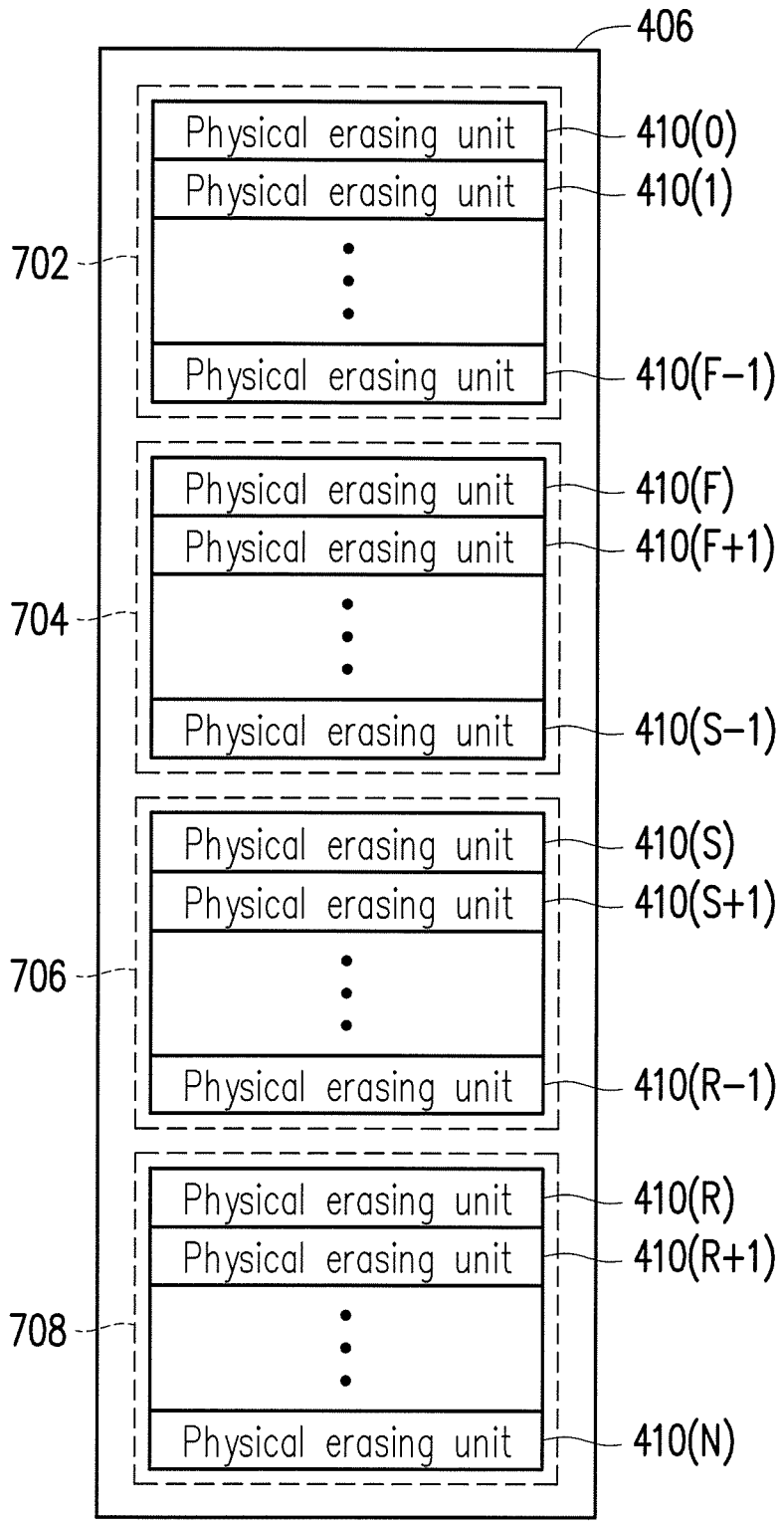
FIG. 7A and FIG. 7B are schematic diagrams illustrating a management of physical erasing units according to an exemplary embodiment.
Figure 7B:
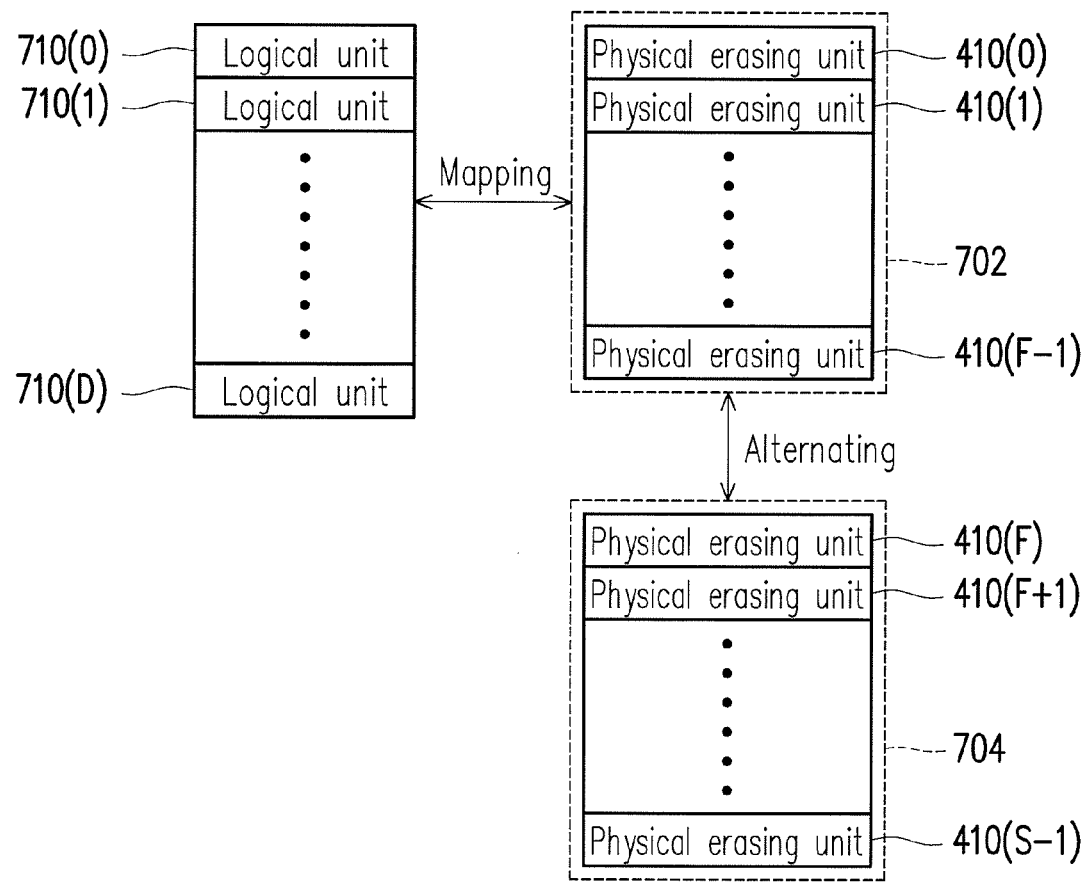

FIG. 7A and FIG. 7B are schematic diagrams illustrating a management of physical erasing units according to an exemplary embodiment.

It should be understood that terms, such as "get", "retrieve", "group", "divide", "associate" and so forth, are logical concepts which describe operations in the physical erasing units of the rewritable non-volatile memory module 406. That is, the physical erasing units of the rewritable non-volatile memory module are logically operated, but actual positions of the physical units of the rewritable non-volatile memory module are not changed.

Referring to FIG. 7A, the memory control circuit unit 404 (or the memory management circuit 502) may logically group the physical erasing units 410(0) to 410(N) into a data area 702, a spare area 704, a system area 706 and a replacement area 708.

The physical erasing units logically belonging to the data area 702 and the spare area 704 are configured to store data from the host system 11. More specifically, the physical erasing units of the data area 702 are regarded as the physical erasing units stored with the data, whereas the physical erasing units of the spare area 704 are configured to replace the physical erasing units of the data area 702. In other words, when the write command and the data to be written are received from the host system 11, the memory management unit 502 retrieves the physical erasing units from the spare area 704, and writes the data into the retrieved physical erasing units as the replacement of the physical erasing units in the data area 702.

The physical erasing units logically belonging to the system area 706 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 708 are used in a bad physical erasing unit replacement procedure for replacing damaged physical erasing units. More specifically, if the replacement area 708 still includes normal physical erasing units when the physical erasing units of the data area 702 are damaged, the memory management circuit 502 retrieves the normal physical erasing units from the replacement area 708 for replacing the damaged physical erasing units.

Particularly, the numbers of the physical erasing units in the data area 702, the spare area 704, the system area 706 and the replacement area 708 may be different from one another according to the different memory specifications. In addition, it should be understood that, during operation of the memory storage device 10, grouping relations of the physical erasing units for associating with the data area 702, the spare area 704, the system area 706, and the replacement area 708 may be dynamically changed. For example, when the damaged physical erasing units in the spare area 704 are replaced by the physical erasing units in the replacement area 708, the physical erasing units originally from the replacement area 708 are then associated with the spare area 704.

Referring to FIG. 7B, as described above, the physical erasing units of the data area 702 and the spare area 704 are configured to store data written from the host system 11 in an alternating manner. In the present exemplary embodiment, the memory control circuit unit 404 (or the memory management circuit 502) may assign logical units 710(0) to 710(D) to the host system 11 for mapping a part of physical erasing units 414(0) to 410(F−1) in the data area 702, so as to facilitate in data accessing on the physical erasing units which store the data in the alternating manner. Particularly, the host system 11 may access the data in the data area 702 through the logical units 710(0) to 710(D). Further, the memory control circuit unit 404 (or the memory management circuit 502) establishes a logical-physical mapping table to record a mapping relation between logical units and physical erasing units. The logical-physical mapping table may also record, for example, various logical and physical correspondence relations such as a mapping relation between the logical units and the physical programming units, a mapping relation between the logical programming units and the physical programming units and/or a mapping relation between the logical programming units and the physical erasing units, which are not particularly limited by the invention.

In the present exemplary embodiment, when a write operation is performed by the host system 11, the memory control circuit unit 404 (or the memory management circuit 502) retrieves a physical erasing unit from the spare area 704 and directly writes write-in data corresponding to the write operation into the retrieved physical erasing unit, and replaces the physical erasing unit retrieved from the spare area 704 by the physical erasing unit of the data area 702 by mapping the logical unit to be written by the write operation to the retrieve physical erasing unit. However, the invention is not limited thereto. For example, in another exemplary embodiment of the invention, the memory control circuit unit 404 (or the memory management circuit 502) temporarily stores the data to be written into the rewritable non-volatile memory module 406 from the host system 11 into a retrieved temporary physical erasing unit, and moves the data temporarily stored in the temporary physical erasing unit to the physical erasing unit mapped to the logical unit to be written only when a data merging is performed. In yet another exemplary embodiment, the buffer units 610(0) to 610(511) may be used to temporarily store the data and command to be written into the rewritable non-volatile memory module 406 from the host system 11, or the data from the rewritable non-volatile memory module 406. Therefore, when the write operation is performed by the host system 11, the memory control circuit unit 404 (or the memory management circuit 502) may also temporarily store the write-in data corresponding to the write operation into an unoccupied buffer unit among the buffer units 610(0) to 610(511) in the buffer memory 508.

In other words, the physical erasing units of the spare area 704 and the buffer units 610(0) to 610(511) may all be used as temporary storage area when the memory control circuit unit 404 (or the memory management circuit 502) in the memory storage device 10 performs a foreground task or a background task. Herein, the data to be written into the rewritable non-volatile memory module 406 from the host system 11 belongs to a data stream generated by the foreground task, and the data written into the rewritable non-volatile memory module 406 when storing a mapping table, performing a garbage collection or an error collection belongs to a data stream generated by the background task. The invention controls speed and performance of the memory storage device 10 for transmitting and accessing data by restricting the data amount to be written into the temporary physical erasing unit or the buffer unit by the host system 11 within a period of time (e.g., the data stream generated by the foreground task) and restricting the data amount to be written into the rewritable non-volatile memory module 406 from the temporary physical erasing unit and the buffer unit (e.g., the data stream generated by the foreground task and the data stream generated by the background task).

Referring back to FIG. 4 and FIG. 5, in order to avoid the system overheat caused by operation of the memory storage device 10, the memory control circuit unit 404 (or the memory management circuit 502) detects a temperature of the memory storage device 10, so as to perform operations of controlling a data transmission speed and controlling a data access speed when the temperature of the memory storage device 10 is greater than a temperature threshold. Herein, the temperature of the memory storage device 10 may be a temperature of the memory control circuit unit 404 (or the memory management circuit 502) itself, a temperature of the DDR DRAM 408, or an overall temperature of the rewritable non-volatile memory module 406 or the memory storage device 10. In the present exemplary embodiment, the memory control circuit unit 404 (or the memory management circuit 502) sets a maximum permissible temperature and a full execution speed of the memory storage device 10. In general, an endurable maximum temperature of the memory control circuit unit 404 (or the memory management circuit 502) is 120° C. When the temperature of the memory control circuit unit 404 (or the memory management circuit 502) exceeds this endurable maximum temperature, the memory control circuit unit 404 (or the memory management circuit 502) may stop operating or even burnt out due to overheat, resulting in data loss. Because this example is described by detecting the temperature of the memory control circuit unit 404 (or the memory management circuit 502) itself, the memory control circuit unit 404 (or the memory management circuit 502) may set the maximum permissible temperature of the memory storage device 10 as 120° C. However, the invention is not intended to limit the maximum permissible temperature. For example, the maximum permissible temperature may be set according to a factory specification of the memory storage device 10, and may also be set according to an execution performance of the memory storage device 10.

Further, under normal circumstances (i.e., when the temperature of the memory control circuit unit 404 (or the memory management circuit 502) does not reach the temperature threshold yet), the memory control circuit unit 404 (or the memory management circuit 502) writes and reads data by the full execution speed. For example, the memory control circuit unit 404 (or the memory management circuit 502) sets the full execution speed of the memory storage device 10 as 1400 megabit per second (MB/sec). However, the invention is not limited thereto. For example, the memory control circuit unit 404 (or the memory management circuit 502) may set the full execution speed of the memory storage device 10 as greater than 1400 MB/sec or less than 1400 MB/sec according to actual operating situation of the memory storage device 10.

The temperature threshold is configured to serve as a reference for determining whether the temperature of the memory storage device 10 is extremely high by the memory control circuit unit 404 (or the memory management circuit 502). In the present exemplary embodiment, the memory control circuit unit 404 (or the memory management circuit 502) and the DDR DRAM 408 have their own endurable maximum temperatures. For example, the endurable maximum temperature of the memory control circuit unit 404 (or the memory management circuit 502) is 120° C., and the endurable maximum temperature of the DDR DRAM 408 is 90° C. Because the endurable maximum temperature of the DDR DRAM 408 is lower as compared to the memory control circuit unit 404 (or the memory management circuit 502), in the operation of comparing the temperature of the memory control circuit unit 404 (or the memory management circuit 502) and the temperature threshold, the temperature threshold is set as 80° C. As such, a condition in which the temperature the DRR DRAM 408 already exceeds its endurable maximum temperature (i.e., 90° C.) when the temperature of the memory control circuit unit 404 (or the memory management circuit 502) is greater than the temperature threshold may be avoided. For example, when the temperature of the memory control circuit unit 404 (or the memory management circuit 502) reaches 100° C., the temperature of the DDR DRAM 408 may already exceed 80° C. (i.e., close to its endurable maximum temperature). Therefore, by setting the temperature threshold as 80° C., operations of controlling the data transmission speed, controlling the access speed and cooling may be performed before the temperature of the memory control circuit unit 404 (or the memory management circuit 502) and the temperature of the DDR DRAM 408 reach their own endurable maximum temperatures, so as to avoid the system overheat caused by operation of the memory storage device 10. It should be noted that, the invention sets the temperature threshold according to the temperature of the memory control circuit unit 404 (or the memory management circuit 502) and the temperature of the DDR DRAM 408 in actual detection, and the invention is not intended to limit a size of the temperature threshold. For example, in other exemplary embodiments, the temperature threshold may be set as greater than 80° C. or less than 80° C.

In the present exemplary embodiment of the invention, the memory control circuit unit 404 (or the memory management circuit 502) determines whether the temperature of the memory storage device 10 (e.g., the temperature of the memory control circuit unit 404 (or the memory management circuit 502) itself) is greater than the temperature threshold. When the temperature of the memory control circuit unit 404 (or the memory management circuit 502) is not greater than the temperature threshold, the memory control circuit unit 404 (or the memory management circuit 502) writes and reads data by the full execution speed. Conversely, when the temperature of the memory control circuit unit 404 (or the memory management circuit 502) is greater than the temperature threshold, the memory control circuit unit 404 (or the memory management circuit 502) calculates a delay count corresponding each unit temperature between the maximum permissible temperature and the temperature threshold according to the full execution speed, so as to further perform the operations of controlling the data transmission speed, controlling the data access speed and cooling according to the calculated delay count. Specifically, the delay count is configured to serve as a reference for reducing the data transmission and access speeds by the memory control circuit unit 404 (or the memory management circuit 502). For example, the memory control circuit unit 404 (or the memory management circuit 502) divides the full execution speed into a plurality of delay speed equal parts according to a difference (i.e., also known as a first temperature difference) between the maximum permissible temperature and the temperature threshold. In the example where the maximum permissible temperature is 120° C., the temperature threshold is 80° C. and the full execution speed is 1400 MB/sec, a magnitude of the delay speed equal parts is 35 MB/sec (i.e., 1400/(120° C.–80° C.)) so the memory control circuit unit 404 (or the memory management circuit 502) sets the delay count as 35 MB/sec. Accordingly, when the temperature of the memory control circuit unit 404 (or the memory management circuit 502) exceeds the temperature threshold (i.e., 80° C.), the memory control circuit unit 404 (or the memory management circuit 502) reduces a current execution speed of the memory control circuit unit 404 (or the memory management circuit 502) by 35 MB/sec with reference to the delay count each time when the temperature of the memory control circuit unit 404 (or the memory management circuit 502) is raised by 1° C. It should be noted that, the invention is not intended to limit the method of calculating the delay count or a size of the delay count. For example, in another exemplary embodiment of the invention, the delay count may be set as greater than 35 MB/sec or less than 35 MB/sec based on demands.

More specifically, in the example of processing the data stream generated by the foreground task, when the host system 11 performs the write operation to write data (also known as first data), the memory control circuit unit 404 (or the memory management circuit 502) receives the first data from the host system 11 within a delay time (also known as a third delay time) according to the delay count, and sends a write command sequence (also known as a first write command sequence) which instructs to write the first data into the rewritable non-volatile memory module 406 within another delay time (also known as a first delay time) according to the delay count. When the write operation is performed by the host system 11, the memory control circuit unit 404 (or the memory management circuit 502) temporarily stores the write-in data corresponding to the write operation into the physical erasing unit in the spare area 704 or the unoccupied buffer unit among the buffer units 610(0) to 610(511) in the buffer memory 508. Therefore, after the write-in data is temporarily stored into the physical erasing unit of the spare area 704 or the buffer memory 508, the memory control circuit unit 404 (or the memory management circuit 502) sends a confirmation message to the host system 11 so as to notify the host system 11 that the write operation is completed. In other words, the third delay time is a total time started when the host system 11 transmits all the data corresponding to the write operation into the memory storage device 10 until at least one confirmation message is sent to the host system 11 by the memory control circuit unit 404 (or the memory management circuit 502); the first delay time is a total time spent by the memory control circuit unit 404 (or the memory management circuit 502) for writing all the write-in data corresponding to the write operation from the physical erasing unit in the spare area 704 or the buffer unit into the rewritable non-volatile memory module 406.

For instance, the memory control circuit unit 404 (or the memory management circuit 502) obtains a target access speed according to a difference (also known as a second temperature difference) between the detected temperature of the memory control circuit unit 404 (or the memory management circuit 502) and the delay count. Herein, it is assumed that the detected temperature of the memory control circuit unit 404 (or the memory management circuit 502) is 90° C., and the temperature threshold and the delay count are 80° C. and 35 MB/sec respectively. When the temperature of the memory control circuit unit 404 (or the memory management circuit 502) exceeds the temperature threshold (i.e., 80° C.), because the memory control circuit unit 404 (or the memory management circuit 502) reduces the current execution speed by 35 MB/sec each time when the temperature of the memory control circuit unit 404 (or the memory management circuit 502) is raised by 1° C., the memory control circuit unit 404 (or the memory management circuit 502) may determine that the current execution speed must be reduced by a total of 350 MB/sec (i.e., (90° C.–80° C.)*35 MB/sec). In the case where the current execution speed of the memory control circuit unit 404 (or the memory management circuit 502) is the full execution speed (i.e., 1400 MB/sec), the memory control circuit unit 404 (or the memory management circuit 502) further obtains the target access speed being 1050 MB/sec (i.e., 1400 MB/sec-350 MB/sec).

Next, the memory control circuit unit 404 (or the memory management circuit 502) calculates a delay time (also known as a fourth delay time) corresponding to each of parts of the first data according to the target access speed (i.e., 1050 MB/sec) and a size of each of the parts of the first data. For example, the fourth delay time is a time started when the host system 11 transmits the write command corresponding to the write operation and the write-in data having the size of 4 KB to the memory storage device 10 until one confirmation message is sent to the host system 11 by the memory control circuit unit 404 (or the memory management circuit 502). In other words, the memory control circuit unit 404 (or the memory management circuit 502) calculates a time required for the host system 11 to receive one confirmation message sent by the memory control circuit unit 404 (or the memory management circuit 502) after one part of the first data having the size of 4 KB is transmitted to the memory storage device 10 by the host system 11 and said one part of the first data is temporarily stored into the buffer unit of the buffer memory 508 by the memory control circuit unit 404 (or the memory management circuit 502), so that the memory control circuit unit 404 (or the memory management circuit 502) may then perform the write operation which belongs to the data stream generated by the foreground task by using the target access speed. Herein, the fourth delay time corresponding to each of the parts of the first data calculated by the memory control circuit unit 404 (or the memory management circuit 502) is 3.9 μs (microsecond) (i.e., (4*1024)/1050)). In other words, each time when one part of the first data is received, the memory control circuit unit 404 (or the memory management circuit 502) temporarily stores this one part of the first data into the retrieved temporary physical erasing unit or the unoccupied buffer unit among the buffer units within 3.9 μs and sends one confirmation message to the host system 11. If the number of the parts of the first data to be written into the rewritable non-volatile memory module 406 and transmitted by the host system 11 is more than one, the memory control circuit unit 404 (or the memory management circuit 502) sequentially temporarily stores each of the parts of the first data into the buffer unit within the fourth delay time (i.e., one part of the first data is temporarily stored into the temporary physical erasing unit or the buffer unit once per 3.9 μs), so that the memory control circuit unit 404 (or the memory management circuit 502) may perform the write operation within the third delay time which belongs to the data stream generated by the foreground task with 1050 MB/sec to achieve a cooling effect.

Figure 8:
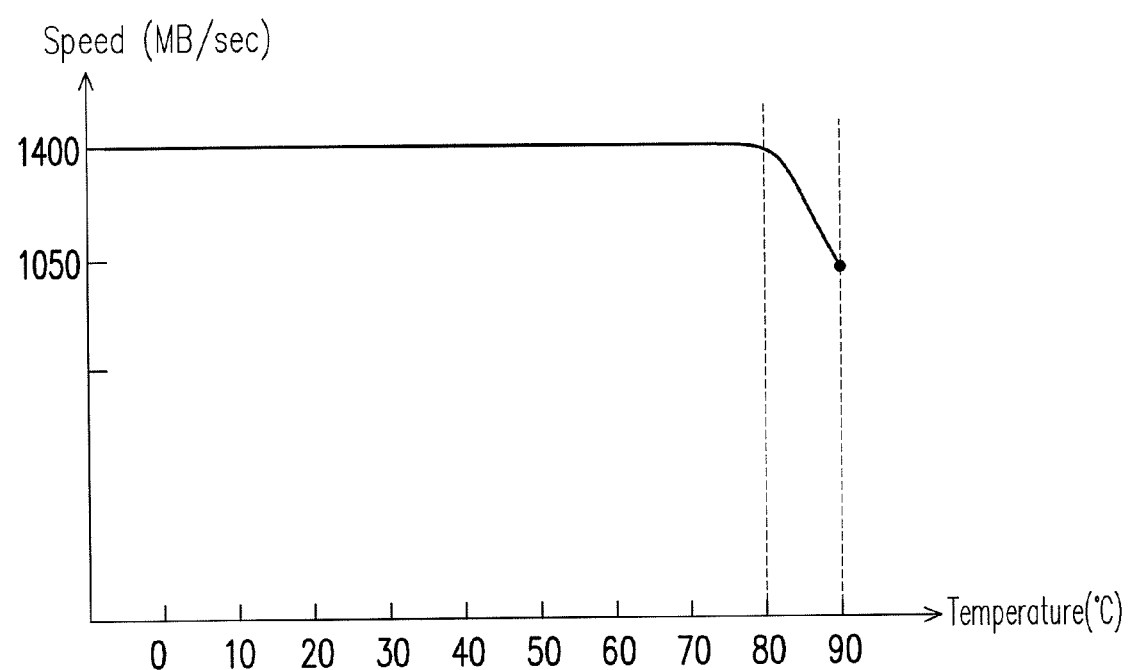
FIG. 8 is a schematic diagram illustrating an example of relation between temperature and speed when a data access speed control is performed on the memory storage device according to an exemplary embodiment.

FIG. 8 is a schematic diagram illustrating an example of relation between temperature and speed when a data access speed control is performed on the memory storage device according to an exemplary embodiment.

Referring to FIG. 8, in the previous example where the memory control circuit unit 404 (or the memory management circuit 502) performs the write operation which belongs to the data stream generated by the foreground task with 1050 MB/sec, the speed of the memory control circuit unit 404 (or the memory management circuit 502) for processing the data stream generated by the foreground task may be reduced from the full execution speed (i.e., 1400 MB/sec) down to the target access speed (i.e., 1050 MB/sec) by sequentially temporarily storing one part of the first data into the temporary physical erasing unit or the buffer unit one per the fourth delay time. As such, a current temperature (i.e., 90° C.) of the memory control circuit unit 404 (or the memory management circuit 502) will not continue to rise. At this time, if the host system 11 stops writing data, the memory control circuit unit 404 (or the memory management circuit 502) sets the speed for processing the data stream generated by the foreground task back to the full execution speed. Later, when the host system 11 starts to write data into the memory storage device 10 again, the memory control circuit unit 404 (or the memory management circuit 502) determines to process the data stream generated by the foreground task by the full execution speed or performs the operations of controlling data transmission and access speeds according to the detected temperature and the temperature threshold.

After a plurality of parts of the first data each having the size of 4 KB received from the host system 11 are written into the buffer units by the memory control circuit unit 404 (or the memory management circuit 502), the memory control circuit unit 404 (or the memory management circuit 502) transmits the parts of the first data to a flash translation layer (FTL). Specifically, the flash translation layer is an operating interface for writing and erasing provided between a file system of the host system 11 and the rewritable non-volatile memory module 406. For example, the flash translation layer is formed by a controller between an operating system of the host system 11 and the memory storage device 10. During the write operation of the rewritable non-volatile memory module 406, the flash translation layer may map the logical units generated by the file system of the host system 11 to the physical erasing units of the rewritable non-volatile memory module 406. In the present exemplary embodiment, the memory control circuit unit 404 (or the memory management circuit 502) transmits or accesses data in 16 KB units. 16 KB is a size of one physical programming unit of the rewritable non-volatile memory (i.e., the first unit size). Accordingly, the memory control circuit unit 404 (or the memory management circuit 502) groups each four parts of the first data into a data group having the size of the 16 KB and transmits the data group having the size of 16 KB to the rewritable non-volatile memory module 406 to be programmed and written into the rewritable non-volatile memory module 406.

In the present exemplary embodiment of the invention, other than cooling and reducing the speed by reducing a bus frequency for processing the first data to be written into the buffer unit from the host system 11 by the memory control circuit unit 404 (or the memory management circuit 502), the memory control circuit unit 404 (or the memory management circuit 502) further controls a write speed for writing the parts of the first data in the temporary physical erasing unit or the buffer unit into the rewritable non-volatile memory module 406. Specifically, the memory control circuit unit 404 (or the memory management circuit 502) groups the parts of the first data from the host system 11 into a plurality of first data groups according to the first unit size (i.e., the size of one physical programming unit) of the memory storage device 10 for transmitting or accessing data. For example, each four parts of the first data are grouped into one first data group. In other words, a size of each of the first data groups is equal to 16 KB. Similarly, in the present exemplary embodiment, the memory control circuit unit 404 (or the memory management circuit 502) obtains the delay count "35 MB/sec" and the target access speed "1050 MB/sec" according to the maximum permissible temperature "120° C.", the temperature threshold "80° C.", and the detected temperature "90° C." of the memory control circuit unit 404 (or the memory management circuit 502) and the full execution speed "1400 MB/sec".

Next, the memory control circuit unit 404 (or the memory management circuit 502) calculates a delay time (also known as a second delay time) corresponding to each of the first data groups according to the target access speed (i.e., 1050 MB/sec) and the size of each of the first data groups (i.e., the size of one physical programming unit). In other words, the memory control circuit unit 404 (or the memory management circuit 502) calculates a time required for the memory control circuit unit 404 (or the memory management circuit 502) to program one of the first data groups into the rewritable non-volatile memory module 406, so that the memory control circuit unit 404 (or the memory management circuit 502) may perform the write operation which belongs to the data stream generated by the foreground task with the target access speed. Herein, the second delay time corresponding to each of the first data groups calculated by the memory control circuit unit 404 (or the memory management circuit 502) is 15.6 µs (microsecond) (i.e., (16*1024)/1050). In other words, the memory control circuit unit 404 (or the memory management circuit 502) sends the first write command sequence which instructs to sequentially write each of the first data groups into the rewritable non-volatile memory module 406 within the second delay time corresponding to each of the first data groups. For example, the memory control circuit unit 404 (or the memory management circuit 502) retrieves one physical erasing unit (also known as a first spare physical erasing unit) from the spare area 704 of the rewritable non-volatile memory module 406 and writes one first data group into the first spare physical erasing unit within 15.6 µs. That is to say, one first data group is programmed into the rewritable non-volatile memory module 406 once per 15.6 µs. Accordingly, not only is the bus frequency in process at upper layer of the memory storage device 10 for writing the first data from the host system 11 into the buffer unit reduced, the bus frequency in process at bottom layer of the memory storage device 10 for writing the first data group from the temporary physical erasing unit or the buffer unit into the rewritable non-volatile memory module 406 may also be reduced. As a result, an overall cooling effect may be effectively achieved by controlling the data transmission and access speeds at said upper and bottom layers.

It is worth mentioning that, while performing the foreground task, the memory control circuit unit 404 (or the memory management circuit 502) may also perform the background task at the same time. For example, while the memory control circuit unit 404 (or the memory management circuit 502) is processing the data to be written into the rewritable non-volatile memory module 406 from the host system 11, it is possible that the memory control circuit unit 404 (or the memory management circuit 502) is performing the background task (e.g., a garbage collection procedure) at the same time in order to release extra memory spaces. In other words, if only the data transmission and access speeds are controlled for the data stream generated by the foreground task when the temperature of the memory control circuit unit 404 (or the memory management circuit 502)

already exceeds the temperature threshold, the data stream generated by the background task may still be constantly written into the rewritable non-volatile memory module 406 by the full execution speed at the bottom layer to thereby influence the temperature of the memory storage device 10 so that the cooling effect may not be effectively achieved on the memory storage device 10.

Therefore, in another exemplary embodiment of the invention, the memory control circuit unit 404 (or the memory management circuit 502) also takes in consideration of an execution speed when writing the data stream generated by the background task from the buffer unit into the rewritable non-volatile memory module 406. Specifically, when performing the garbage collection procedure, the memory control circuit unit 404 (or the memory management circuit 502) selects one or more physical erasing units (also known as a first physical erasing unit) from the physical erasing units of the data area 702, so as to copy valid data from the data stored in the one or more first physical erasing units and group these valid data into a plurality of data groups (also known as second data groups) according to the first unit size (i.e., the size of one physical programming unit, e.g., 16 KB). In other words, a size of one of the second data groups is equal to 16 KB. Next, the memory control circuit unit 404 (or the memory management circuit 502) copies and temporarily stores each of the second data groups into the retrieved temporary physical erasing unit in the spare area 704 or the unoccupied buffer unit among the buffer units.

Herein, steps of obtaining the delay count and the target access speed by the memory control circuit unit 404 (or the memory management circuit 502) are identical to arithmetic operations in the foregoing embodiments, which are not repeated hereinafter. For example, the memory control circuit unit 404 (or the memory management circuit 502) may obtain the delay count "35 MB/sec" and the target access speed "1050 MB/sec" according to the maximum permissible temperature "120° C.", the temperature threshold "80° C.", and the detected temperature "90° C." of the memory control circuit unit 404 (or the memory management circuit 502) and the full execution speed "1400 MB/sec".

Then, the memory control circuit unit 404 (or the memory management circuit 502) calculates the second delay time corresponding to each of the second data groups according to the target access speed (i.e., 1050 MB/sec) and the size of each of the second data groups (i.e., the size of one physical programming unit). That is to say, the memory control circuit unit 404 (or the memory management circuit 502) calculates a time required for the memory control circuit unit 404 (or the memory management circuit 502) to program one of the second data groups into the rewritable non-volatile memory module 406, so that the memory control circuit unit 404 (or the memory management circuit 502) may also perform the write operation which belongs to the data stream generated by the background task with the target access speed. Similarly, the second delay time corresponding to each of the second data groups calculated by the memory control circuit unit 404 (or the memory management circuit 502) is 15.6 μs (microsecond) (i.e., (16*1024)/1050). In other words, the memory control circuit unit 404 (or the memory management circuit 502) sends a write command sequence (also known as a second write command sequence) which instructs to sequentially write each of the second data groups into the rewritable non-volatile memory module 406 within the second delay time corresponding to each of the second data groups. For example, the memory control circuit unit 404 (or the memory management circuit 502) writes one of the second data group temporarily stored in the temporary physical erasing unit or the buffer unit into one recycled physical erasing unit within 15.6 μs. That is to say, one second data group is programmed into the rewritable non-volatile memory module 406 once per 15.6 μs. Herein, the recycled physical erasing unit may be, for example, one physical erasing unit (also known as a second spare physical erasing unit) retrieved from the spare area 704. After writing the copied valid data into the second spare physical erasing unit, the memory control circuit unit 404 (or the memory management circuit 502) erases the first physical erasing unit. Accordingly, by using the method of controlling the data transmission and access speeds according to the present exemplary embodiment, not only are the bus frequencies in processes at both the upper layer and the bottom layer of the memory storage device 10 for writing foreground data from the host system 11 into the rewritable non-volatile memory module 406 reduced, the bus frequency in process at bottom layer of the memory storage device 10 for writing background data from the buffer unit into the rewritable non-volatile memory module 406 may also be reduced. The heat generation and the heat dissipation of the memory storage device 10 may indeed reach the stable state by controlling the transmission speed and the access speed for the foreground data and the background data.

In particular, the invention is not intended to limit the timing for performing the garbage collection procedure by the memory control circuit unit 404 (or the memory management circuit 502). For example, the memory control circuit unit 404 (or the memory management circuit 502) determines whether available physical erasing units among the physical erasing units are less than a predetermined available number, and perform the garbage collection procedure only when the available physical erasing units is less than the predetermined available number. Alternatively, in another exemplary embodiment of the invention, the memory control circuit unit 404 (or the memory management circuit 502) regularly performs the garbage collection procedure once per a fixed time interval. It is possible that the memory control circuit unit 404 (or the memory management circuit 502) may perform the garbage collection procedure synchronously while writing the first data from the host system 11 into the retrieved first spare physical erasing unit. Therefore, the first physical erasing unit excludes the first spare physical erasing unit which is to be written with the data from the host system 11. Further, the first physical erasing unit also excludes the second spare physical erasing unit serving as the recycled physical erasing unit, and the first spare physical erasing unit is different from the second spare physical erasing unit.

It is worth mentioning that, the delay count corresponding each unit temperature between the maximum permissible temperature and the temperature threshold is calculated according to the full execution speed in the foregoing exemplary embodiments, so as to further perform the operations of controlling the data transmission speed, controlling the access speed and cooling according to the calculated delay count. However, the invention is not limited thereto. In another exemplary embodiment of the invention, the size of the delay count may also be directly set based on different demands, so as to achieve the cooling effect faster or slow down the speed of warming. For example, the delay count may be set as 50 MB/sec when intending to achieve the cooling effect faster. In other words, in the example where the temperature of the memory control circuit unit 404 (or the memory management circuit 502) is 90° C. and the temperature threshold is 80° C., the memory control circuit unit 404 (or the memory management circuit 502) reduces the current execution speed by 50 MB/sec each time when the temperature of the memory control circuit unit 404 (or the memory management circuit 502) is raised by 1° C., such that the memory control circuit unit 404 (or the memory management circuit 502) may determine that the current execution speed must be reduced by a total of 500 MB/sec (i.e., (90° C.−80° C.).*50 MB/sec). In the case where the current execution speed of the memory control circuit unit 404 (or the memory management circuit 502) is the full execution speed (i.e., 1400 MB/sec), the memory control circuit unit 404 (or the memory management circuit 502) obtains the target access speed being 900 MB/sec (i.e., 1400 MB/sec-500 MB/sec). In other words, a magnitude of the target access speed depends on the delay count being set according to the cooling effect to be achieved, such that different cooling effects may also be achieved more flexibly based on demands. Similarly, after the target access speed is obtained, the delay times for transmitting the data at the upper layer and the bottom layer may be obtained respectively according to the unit sizes for transmitting the data at the upper layer and the bottom layer in order to effectively achieve the overall cooling effect.

Figure 9:
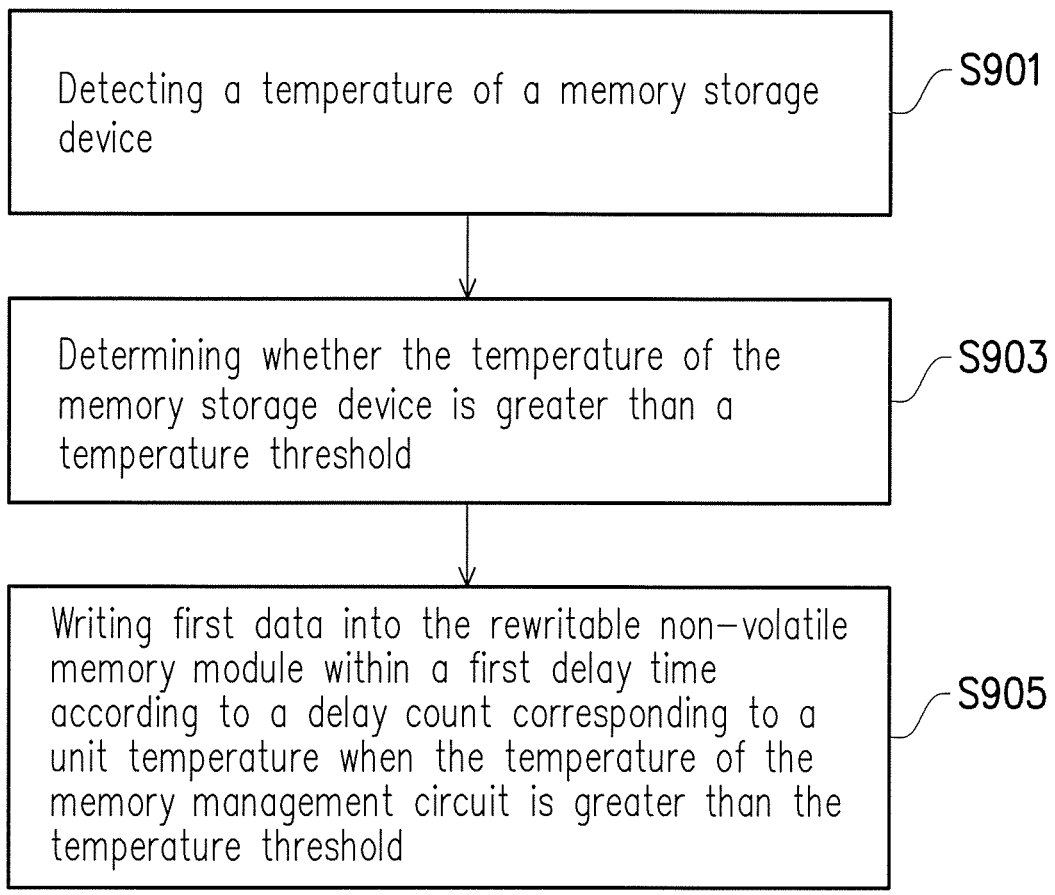
FIG. 9 is a flowchart illustrating a data transmitting method according to an exemplary embodiment of the invention.

FIG. 9 is a flowchart illustrating a data transmitting method according to an exemplary embodiment of the invention.

Referring to FIG. 9, in step S901, the memory control circuit unit 404 (or the memory management circuit 502) detects a temperature of the memory storage device 10.

In step S903, the memory control circuit unit 404 (or the memory management circuit 502) determines whether the temperature of the memory storage device 10 is greater than a temperature threshold.

In step S905, the memory control circuit unit 404 (or the memory management circuit 502) writes first data into the rewritable non-volatile memory module within a first delay time according to a delay count corresponding to a unit temperature when the temperature of the memory management circuit is greater than the temperature threshold.

Nevertheless, steps depicted in FIG. 9 are described in detail as above so that related description thereof is omitted hereinafter. It should be noted that, the steps depicted in FIG. 9 may be implemented as a plurality of program codes or circuits, which are not particularly limited in the invention. Moreover, the method of FIG. 9 may be implemented by reference with above exemplary embodiments, or may be implemented separately, which are not particularly limited in the invention.

In summary, in the data transmitting method, the memory control circuit unit and the memory storage device according to the exemplary embodiments of the invention, the transmission speed and the access speed for processing the data stream to be written into the rewritable non-volatile memory module by the host system at the upper layer and the bottom layer may be controlled when the temperature of the memory storage device reaches the temperature threshold. As such, the bus frequency for processing the foreground data may be reduced to effectively prevent overheat of system caused by rapidly writing the large amount of data during operation of the memory storage device. Further, the data transmitting method according to the exemplary embodiments of the invention is also capable of controlling the access speed of the memory storage device for the data stream generated by the background task (e.g., the garbage collection procedure) at the bottom layer. Accordingly, the heat generation and the heat dissipation of the memory storage device may indeed reach the stable state by taking in consideration of both the transmission speed and the access speed for the foreground data and the background data, so as to improve both the data transmission speed and the data access performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmitting method for a memory storage device having a rewritable non-volatile memory module, comprising:
   detecting a temperature of the memory storage device;
   determining whether the temperature of the memory storage device is greater than a temperature threshold;
   writing first data into the rewritable non-volatile memory module within a first delay time according to a delay count corresponding to a unit temperature if the temperature is greater than the temperature threshold.

2. The data transmitting method of claim 1, further comprising:
   setting a maximum permissible temperature and a full execution speed of the memory storage device; and
   calculating the delay count according to the full execution speed, the maximum permissible temperature and the temperature threshold.

3. The data transmitting method of claim 2, wherein the step of calculating the delay count according to the full execution speed, the maximum permissible temperature and the temperature threshold comprises:
   dividing the full execution speed into a plurality of delay speed equal parts according to a first temperature difference between the maximum permissible temperature and the temperature threshold, wherein a value of each of the delay speed equal parts is equal to the delay count.

4. The data transmitting method of claim 1, wherein the rewritable non-volatile memory module comprises a plurality of physical erasing units, and the physical erasing units comprise at least one spare physical erasing unit,
   wherein the step of writing the first data into the rewritable non-volatile memory module within the first delay time according to the delay count corresponding to the unit temperature comprises:
   grouping a plurality of parts of the first data into a plurality of first data groups according to a first unit size of the memory storage device for transmitting or accessing data, wherein a size of each of the first data groups is equal to the first unit size; and
   sequentially writing each of the first data groups into a first spare physical erasing unit retrieved from the at least one spare physical erasing unit within a second delay time corresponding to each of the first data groups according to the delay count, wherein one first data group is written into the first spare physical erasing unit once per second delay time.

5. The data transmitting method of claim 4, wherein the step of sequentially writing each of the first data groups into the first spare physical erasing unit retrieved from the at least one spare physical erasing unit within the second delay time corresponding to each of the first data groups according to the delay count comprises:

obtaining a target access speed according to the delay count and a second temperature difference between the temperature of the memory storage device and the temperature threshold; and calculating the second delay time corresponding to each of the first data groups according to the target access speed and the size of each of the first data groups, wherein the first unit size is equal to a size of one physical programming unit.

6. The data transmitting method of claim 4, further comprising:

selecting a first physical erasing unit from the physical erasing units, wherein the first physical erasing unit excludes the first spare physical erasing unit and stores with a plurality of data;

grouping at least one valid data group among the plurality of data into a plurality of second data groups according to the first unit size of the memory storage device for transmitting or accessing data, wherein a size of each of the second data groups is equal to the first unit size;

sequentially writing each of the second data groups into a second spare physical erasing unit retrieved from the at least one spare physical erasing unit within the second delay time corresponding to each of the second data groups according to the delay count, wherein one second data group is written into the second spare physical erasing unit once per second delay time, and the second spare physical erasing unit is different from the first spare physical erasing unit; and erasing the first physical erasing unit.

7. The data transmitting method of claim 6, wherein the step of sequentially writing each of the second data groups into the second spare physical erasing unit retrieved from the at least one spare physical erasing unit within the second delay time corresponding to each of the second data groups according to the delay count comprises:

obtaining a target access speed according to the delay count and a second temperature difference between the temperature of the memory storage device and the temperature threshold; and calculating the second delay time corresponding to each of the second data groups according to the target access speed and the size of each of the second data groups, wherein the first unit size is equal to a size of one physical programming unit.

8. The data transmitting method of claim 1, wherein before the step of writing the first data into the rewritable non-volatile memory module within the first delay time, the method further comprises:

receiving the first data from a host system within a third delay time according to the delay count.

9. The data transmitting method of claim 8, wherein the step of receiving the first data from the host system within the third delay time according to the delay count comprises:

obtaining a target access speed according to the delay count and a second temperature difference between the temperature of the memory storage device and the temperature threshold;

calculating a fourth delay time corresponding to each of the parts of the first data according to the target access speed and a size of each of the parts of the first data; and sequentially receiving each of the parts of the first data within the fourth delay time corresponding to each of the parts of the first data, wherein a size of each of the parts of the first data is a second unit size less than the size of one physical programming unit and one part of the first data is received once per fourth delay time.

10. A memory control circuit unit for controlling a rewritable non-volatile memory module of a memory storage device, and the memory control circuit unit comprises:

a host interface, configured to couple to a host system;

a memory interface, configured to couple to the rewritable non-volatile memory module; and a memory management circuit, coupled to the host interface and the memory interface, and configured to detect a temperature of the memory management circuit, wherein the memory management circuit is further configured to determine whether the temperature of the memory storage device is greater than a temperature threshold, wherein the memory management circuit is further configured to issue a first write command sequence which instructs to write first data into the rewritable non-volatile memory module within a first delay time according to a delay count corresponding to a unit temperature if the temperature is greater than the temperature threshold.

11. The memory control circuit unit of claim 10, wherein the memory management circuit is further configured to set a maximum permissible temperature and a full execution speed of the memory storage device, wherein the memory management circuit is further configured to calculate the delay count according to the full execution speed, the maximum permissible temperature and the temperature threshold.

12. The memory control circuit unit of claim 11, wherein in the operation of calculating the delay count according to the full execution speed, the maximum permissible temperature and the temperature threshold, the memory management circuit is further configured to divide the full execution speed into a plurality of delay speed equal parts according to a first temperature difference between the maximum permissible temperature and the temperature threshold, wherein a value of each of the delay speed equal parts is equal to the delay count.

13. The memory control circuit unit of claim 10, wherein the rewritable non-volatile memory module comprises a plurality of physical erasing units, and the physical erasing units comprise at least one spare physical erasing unit, wherein in the operation of issuing the first write command sequence which instructs to write the first data into the rewritable non-volatile memory module within the first delay time according to the delay count corresponding to the unit temperature when the temperature is greater than the temperature threshold, the memory management circuit is further configured to group a plurality of parts of the first data into a plurality of first data groups according to a first unit size of the memory storage device for transmitting or accessing data, wherein a size of each of the first data groups is equal to the first unit size, wherein the memory management circuit is further configured to issue the first write command sequence which instructs to sequentially write each of the first data groups into a first spare physical erasing unit retrieved from the at least one spare physical erasing unit within a second delay time corresponding to each of the first data groups according to the delay count, wherein one first data group is written into the first spare physical erasing unit once per second delay time.

14. The memory control circuit unit of claim 13, wherein in the operation of issuing the first write command sequence which instructs to sequentially write each of the first data groups into the first spare physical erasing unit retrieved from the at least one spare physical erasing unit within the second delay time corresponding to each of the first data groups according to the delay count, the memory management circuit is further configured to obtain a target access speed according to the delay count and a second temperature difference between the temperature of the memory storage device and the temperature threshold; and calculate the second delay time corresponding to each of the first data groups according to the target access speed and the size of each of the first data groups, wherein the first unit size is equal to a size of one physical programming unit.

15. The memory control circuit unit of claim 13, wherein the memory management circuit is further configured to select a first physical erasing unit from the physical erasing units, wherein the first physical erasing unit excludes the first spare physical erasing unit and stores with a plurality of data, wherein the memory management circuit is further configured to group at least one valid data group among the plurality of data into a plurality of second data groups according to the first unit size of the memory storage device for transmitting or accessing data, wherein a size of each of the second data groups is equal to the first unit size, wherein the memory management circuit is further configured to issue a second write command sequence which instructs to sequentially write each of the second data groups into a second spare physical erasing unit retrieved from the at least one spare physical erasing unit within the second delay time corresponding to each of the second data groups according to the delay count, wherein one second data group is written into the second spare physical erasing unit once per second delay time, and the second spare physical erasing unit is different from the first spare physical erasing unit, wherein the memory management circuit is further configured to erase the first physical erasing unit.

16. The memory control circuit unit of claim 15, wherein in the operation of issuing the second write command sequence which instructs to sequentially write each of the second data groups into the second spare physical erasing unit retrieved from the at least one spare physical erasing unit within the second delay time corresponding to each of the second data groups according to the delay count, the memory management circuit is further configured to obtain a target access speed according to the delay count and a second temperature difference between the temperature of the memory storage device and the temperature threshold; and the memory management circuit is further configured to calculate the second delay time corresponding to each of the second data groups according to the target access speed and the size of each of the second data groups, wherein the first unit size is equal to a size of one physical programming unit.

17. The memory control circuit unit of claim 10, wherein before issuing the first write command sequence which instructs to write the first data into the rewritable non-volatile memory module within the first delay time, the memory management circuit is further configured to receive the first data from the host system within a third delay time according to the delay count.

18. The memory control circuit unit of claim 17, wherein in the operation of receiving the first data from the host system within the third delay time according to the delay count, the memory management circuit is further configured to obtain a target access speed according to the delay count and a second temperature difference between the temperature of the memory storage device and the temperature threshold;

the memory management circuit is further configured to calculate a fourth delay time corresponding to each of the parts of the first data according to the target access speed and a size of each of the parts of the first data; and the memory management circuit is further configured to sequentially receive each of the parts of the first data within the fourth delay time corresponding to each of the parts of the first data, wherein a size of each of the parts of the first data is a second unit size less than the size of one physical programming unit and one parts of the first data is received once per fourth delay time.

19. A memory storage device, comprising:

a connection interface unit, configured to couple to a host system;

a rewritable non-volatile memory module; and a memory control circuit unit, coupled to the connection interface unit and the rewritable non-volatile memory module, wherein the memory control circuit unit is configured to detect a temperature of the memory management circuit, wherein the memory control circuit unit is further configured to determine whether the temperature of the memory storage device is greater than a temperature threshold, wherein the memory control circuit unit is further configured to issue a first write command sequence which instructs to write first data into the rewritable non-volatile memory module within a first delay time according to a delay count corresponding to a unit temperature if the temperature is greater than the temperature threshold.

20. The memory storage device of claim 19, wherein the memory control circuit unit is further configured to set a maximum permissible temperature and a full execution speed of the memory storage device, wherein the memory control circuit unit is further configured to calculate the delay count according to the full execution speed, the maximum permissible temperature and the temperature threshold.

21. The memory storage device of claim 20, wherein in the operation of calculating the delay count according to the full execution speed, the maximum permissible temperature and the temperature threshold, the memory control circuit unit is further configured to divide the full execution speed into a plurality of delay speed equal parts according to a first temperature difference between the maximum permissible temperature and the temperature threshold, wherein a value of each of the delay speed equal parts is equal to the delay count.

22. The memory storage device of claim 19, wherein the rewritable non-volatile memory module comprises a plurality of physical erasing units, and the physical erasing units comprise at least one spare physical erasing unit, wherein in the operation of issuing the first write command sequence which instructs to write the first data into the rewritable non-volatile memory module within the first delay time according to the delay count corresponding to the unit temperature when the temperature is greater than the temperature threshold, the memory control circuit unit is further configured to group a plurality of parts of the first data into a plurality of first data groups according to a first unit size of the memory storage device for transmitting or accessing data, wherein a size of each of the first data groups is equal to the first unit size, wherein the memory control circuit unit is further configured to issue the first write command sequence which instructs to sequentially write each of the first data groups into a first spare physical erasing unit retrieved from the at least one spare physical erasing unit within a second delay time corresponding to each of the first data groups according to the delay count, wherein one first data group is written into the first spare physical erasing unit once per second delay time.

23. The memory storage device of claim 22, wherein in the operation of issuing the first write command sequence which instructs to sequentially write each of the first data groups into the first spare physical erasing unit retrieved from the at least one spare physical erasing unit within the second delay time corresponding to each of the first data groups according to the delay count, the memory control circuit unit is further configured to obtain a target access speed according to the delay count and a second temperature difference between the temperature of the memory storage device and the temperature threshold; and the memory control circuit unit is further configured to calculate the second delay time corresponding to each of the first data groups according to the target access speed and the size of each of the first data groups, wherein the first unit size is equal to a size of one physical programming unit.

24. The memory storage device of claim 22, wherein the memory control circuit unit is further configured to select a first physical erasing unit form the physical erasing units, wherein the first physical erasing unit excludes the first spare physical erasing unit and stores with a plurality of data, wherein the memory control circuit unit is further configured to group at least one valid data group among the plurality of data into a plurality of second data groups according to the first unit size of the memory storage device for transmitting or accessing data, wherein a size of each of the second data groups is equal to the first unit size, wherein the memory control circuit unit is further configured to issue a second write command sequence which instructs to sequentially write each of the second data groups into a second spare physical erasing unit retrieved from the at least one spare physical erasing unit within the second delay time corresponding to each of the second data groups according to the delay count, wherein one second data group is written into the second spare physical erasing unit once per second delay time, and the second spare physical erasing unit is different from the first spare physical erasing unit, wherein the memory control circuit unit is further configured to erase the first physical erasing unit.

25. The memory storage device of claim 24, wherein in the operation of issuing the second write command sequence which instructs to sequentially write each of the second data groups into the second spare physical erasing unit retrieved from the at least one spare physical erasing unit within the second delay time corresponding to each of the second data groups according to the delay count, the memory control circuit unit is further configured to obtain a target access speed according to the delay count and a second temperature difference between the temperature of the memory storage device and the temperature threshold; and the memory control circuit unit is further configured to calculate the second delay time corresponding to each of the second data groups according to the target access speed and the size of each of the second data groups, wherein the first unit size is equal to a size of one physical programming unit.

26. The memory storage device of claim 19, wherein before issuing the first write command sequence which instructs to write the first data into the rewritable non-volatile memory module within the first delay time, the memory control circuit unit is further configured to receive the first data from the host system within a third delay time according to the delay count.

27. The memory storage device of claim 26, wherein in the operation of receiving the first data from the host system within the third delay time according to the delay count, the memory control circuit unit is further configured to obtain a target access speed according to the delay count and a second temperature difference between the temperature of the memory storage device and the temperature threshold;

the memory control circuit unit is further configured to calculate a fourth delay time corresponding to each of the parts of the first data according to the target access speed and a size of each of the parts of the first data; and the memory control circuit unit is further configured to sequentially receive each of the parts of the first data within the fourth delay time corresponding to each of the parts of the first data, wherein a size of each of the parts of the first data is a second unit size less than the size of one physical programming unit and one part of the first data is received once per fourth delay time.

* * * * *